United States Patent
Araki et al.

(10) Patent No.: US 8,816,615 B2
(45) Date of Patent: Aug. 26, 2014

(54) DRIVE DEVICE FOR RAILWAY VEHICLE

(75) Inventors: Daijiro Araki, Mito (JP); Motomi Shimada, Mito (JP); Yoshihiro Miyaji, Hitachinaka (JP); Keita Suzuki, Hitachinaka (JP); Keishi Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 193 days.

(21) Appl. No.: 13/571,978

(22) Filed: Aug. 10, 2012

(65) Prior Publication Data

US 2013/0063055 A1    Mar. 14, 2013

(30) Foreign Application Priority Data

Sep. 14, 2011    (JP) ................................. 2011-200106

(51) Int. Cl.
*H02P 3/14*    (2006.01)
(52) U.S. Cl.
USPC ............................ 318/376; 318/802; 318/798
(58) Field of Classification Search
USPC ............. 318/376, 3, 802, 798, 806, 762, 759, 318/432, 139, 433
See application file for complete search history.

(56) References Cited

U.S. PATENT DOCUMENTS

2006/0066146 A1 * 3/2006 Otomo ......................... 303/151
2008/0266920 A1 10/2008 Terunuma et al.

FOREIGN PATENT DOCUMENTS

JP    2008-278615    11/2008

* cited by examiner

*Primary Examiner* — Karen Masih
(74) *Attorney, Agent, or Firm* — Antonelli, Terry, Stout & Kraus, LLP.

(57) ABSTRACT

In a drive device for a railway vehicle, in which regeneration braking force is increased by adding the output voltage of a voltage adjustment device to a DC power source voltage, operation of the current control device is started prior to the start of the power running operation or the regeneration operation of the inverter device, and the operation of the current control device is stopped later than the stopping of the power running operation or the regeneration operation of the inverter device. Thereby, the current control device is surely operated at least during the operation period of the inverter device, so that the output voltage of the voltage adjustment device is adjusted by the current control device, to thereby prevent the over-discharge of the energy storage device at the time of power running operation or the overcharge of the energy storage device at the time of regeneration operation.

5 Claims, 16 Drawing Sheets

ENERGY STORAGE DEVICE DISPOSED ON NEGATIVE ELECTRODE SIDE OF INVERTER DEVICE

Figure 1A      ENERGY STORAGE DEVICE DISPOSED ON NEGATIVE ELECTRODE SIDE OF INVERTER DEVICE Figure 1B      ENERGY STORAGE DEVICE DISPOSED ON POSITIVE ELECTRODE SIDE OF INVERTER DEVICE Figure 2A ENERGY STORAGE DEVICE DISPOSED ON NEGATIVE ELECTRODE SIDE OF INVERTER DEVICE Figure 2B ENERGY STORAGE DEVICE DISPOSED ON POSITIVE ELECTRODE SIDE OF INVERTER DEVICE Figure 3A    DURING POWER RUNNING Figure 3B    DURING REGENERATION Figure 4A   ENERGY STORAGE DEVICE DISPOSED ON NEGATIVE ELECTRODE SIDE OF INVERTER DEVICE Figure 4B   ENERGY STORAGE DEVICE DISPOSED ON POSITIVE ELECTRODE SIDE OF INVERTER DEVICE

DRIVE DEVICE FOR RAILWAY VEHICLE The present application is based on and claims priority of Japanese patent application No. 2011-200106 filed on Sep. 14, 2011, the entire contents of which are hereby incorporated by reference.

BACKGROUND OF THE INVENTION

1. Field of the Invention

The present invention relates to a drive device for a railway vehicle, on which an energy storage device is mounted. More particularly, the present invention relates to a drive device for a railway vehicle, which can realize a function (hereinafter referred to as a high-speed range electric brake function) of extending a speed range for operation of a regeneration brake.

2. Description of the Related Art

In the field of railway vehicles, there has been widely used regeneration brake control in which a main motor is operated as a generator at the time of braking so as to convert the kinetic energy of the vehicle into electrical energy and return the energy to the overhead line while obtaining a braking force. The electric power returned to the overhead line by the regeneration brake control can be used as electric power to power the other vehicle to run, and hence the power consumption can be reduced.

However, a problem with the regeneration brake control is that sufficient braking force is not obtained because the regeneration performance is limited by the performance of the main motor or an inverter device in the high-speed range (higher than the terminal velocity of constant torque region).

A technique to solve this problem is described, for example, in Japanese Patent Laid-Open Publication No. 2008-278615 (Patent Document 1). The drive device for a railway vehicle includes a motor, an inverter device for driving the motor, a chargeable and dischargeable energy storage device, and a voltage adjustment device that uses the energy storage device as a power source to adjust the output voltage thereof by a chopper constituted by a current control device. The drive device is configured such that the energy storage device is connected in series with the inverter device, and such that a voltage resulting from adding the voltage generated by the voltage adjusting device to a DC power source voltage (overhead line voltage) is applied to the inverter device. Thereby, the voltage applied to the motor is increased so as to increase the output power of the motor, and hence the regeneration braking force in the high speed range can be increased without increasing the current of the motor.

However, in the technique described in Patent Document 1, the start timing of the chopper is not considered, and hence the technique has a problem that, when the inverter device performs the regeneration operation in a state where the chopper is not operated, that is, in the state where the switching element (current control device) of the chopper is turned off, the regeneration current always flows through the energy storage device so as to cause the energy storage device to be overcharged.

At this time, the voltage of the DC portion of the inverter device has a value resulting from always adding the voltage between terminals of the energy storage device to the DC power source voltage (overhead line voltage). Therefore, when an energy storage device, in which the voltage between the terminals of the energy storage device is not less than a voltage resulting from subtracting the DC power source voltage (overhead line voltage) from the withstand voltage of the inverter device, is used, the voltage of the DC portion of the inverter device exceeds the withstand voltage of the inverter device. Therefore, there is a design limitation that it is necessary to use an energy storage device in which the voltage between the terminals of the energy storage device is not more than a voltage resulting from subtracting the DC power source voltage (overhead line voltage) from the withstand voltage of the inverter device.

Further, there is also a problem that, when the regeneration operation of the inverter device is started and stopped in the state where the switching element of the chopper is turned off, the voltage of the DC portion of the inverter device has a value resulting from instantaneously adding and subtracting the voltage between the terminals of the energy storage device, as it is, to and from the DC power source voltage (overhead line voltage), and hence an over voltage and over current is also applied to the inverter device.

Therefore, an object of the invention is to prevent the over-discharge and overcharge of the energy storage device and further application of an over voltage and over current to the inverter device by adjusting the output voltage of the voltage adjustment device (current flowing through the energy storage device) by using the chopper which is surely operated at least during the operation period of the inverter device in such a manner that, when the power running operation or the regeneration operation of the inverter device is started, the operation of the chopper is started prior to the start of the power running operation or the regeneration operation of the inverter device, and that, when the power running operation or the regeneration operation of the inverter device is stopped, the operation of the chopper is stopped later than the stopping of the power running operation or the regeneration operation of the inverter device.

SUMMARY OF THE INVENTION

In order to solve the above-described problems, a drive device for a railway vehicle according to the present invention includes a pantograph for receiving DC power from a DC voltage source, an inverter device for converting the DC power into AC power, at least one or more AC motors driven by the inverter device, a chargeable and dischargeable energy storage device, and a voltage adjustment device that adjusts the output voltage thereof by using a current control device disposed between the positive and negative electrodes of the energy storage device and configured to switch the connection to the positive electrode side or the negative electrode side of the energy storage device, and is configured such that the energy storage device is connected in series with the inverter device to make the output voltage of the voltage adjustment device added to the voltage of the DC voltage source, and thereby the voltage applied to the inverter device is increased so as to increase the regeneration braking force. Further, the drive device for the railway vehicle according to the present invention is configured such that, when the power running operation or the regeneration operation of the inverter device is started, the operation of the current control device is started prior to the start of the power running operation or the regeneration operation of the inverter device, and such that, when the power running operation or the regeneration operation of the inverter device is stopped, the operation of the current control device is stopped later than the stopping of the power running operation or the regeneration operation of the inverter device. Thereby, the current control device is surely operated at least during the period of the power running operation or the regeneration operation of the inverter device, so that the output voltage of the voltage adjustment device (current flowing through the energy storage device) is adjusted by the current control device, and thereby it is possible to prevent the over-discharge of the energy storage device at the time of the power running operation or to prevent the overcharge of the energy storage device at the time of the regeneration operation.

According to the present invention, it is possible to surely avoid the power running operation or the regeneration operation of the inverter device in the state where the operation of the chopper is stopped, and hence it is possible to prevent the over-discharge or overcharge of the energy storage device. Further, since the output voltage of the voltage adjustment device is always controlled by the chopper, the restriction on the voltage between the terminals of the energy storage device is removed, and hence the flexibility of selecting the energy storage device is improved. Further, it is possible to suppress an abrupt change in the voltage of the DC portion of the inverter device at the time when the power running operation or the regeneration operation of the inverter device is started and stopped, and hence it is also possible to prevent an over voltage or over current from being applied to the inverter device.

DETAILED DESCRIPTION OF THE PREFERRED EMBODIMENTS

Figure 1A:
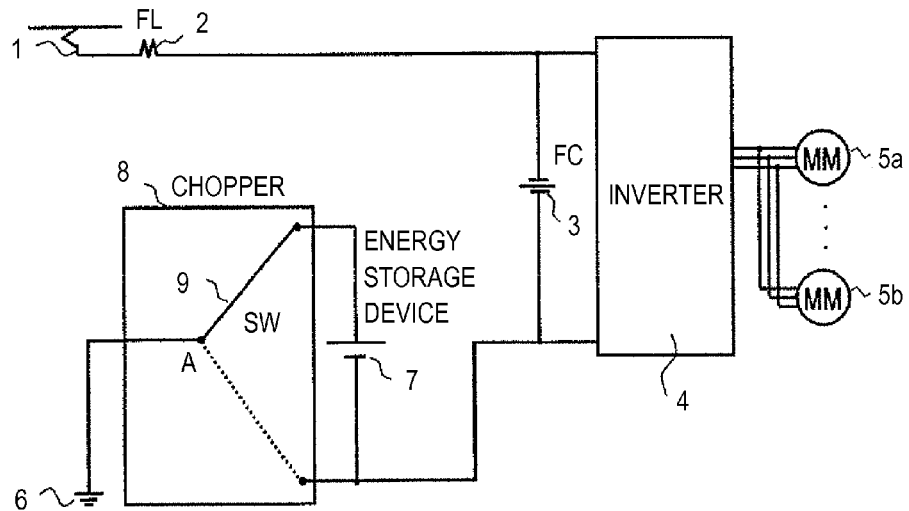
FIG. 1A is a view showing a basic configuration of a first embodiment of a drive device for a railway vehicle according to the present invention (in the case where an energy storage device is disposed on the negative electrode side of an inverter device)

In the following, embodiments according to the present invention will be described with reference to the drawings.
[Embodiment 1]
FIG. 1 shows a basic configuration of a first embodiment of a drive device for a railway vehicle, which is a subject of the present invention. FIG. 3 shows control sequences at the time of power running operation and at the time of regeneration operation in the present embodiment.

As shown in FIG. 1, a drive device for a railway vehicle, which is a subject of the present invention, includes a pantograph 1 for receiving DC power from a DC voltage source, such as an overhead line, an LC circuit (filter circuit) constituted by a filter reactor (FL) 2 and a filter capacitor (FC) 3 so as to remove high frequency variations in the DC power received by the pantograph 1, an inverter device 4 for converting the DC power into AC power, at least one or more AC motors 5a and 5b driven by the inverter device 4, a chargeable and dischargeable energy storage device 7 (such as, for example, a battery and a capacitor), and a voltage adjustment device that adjusts the output voltage thereof by using a chopper 8 which uses the energy storage device 7 as a power source and which is constituted by a current control device, such as a switch 9, disposed between the positive and negative electrodes of the energy storage device 7 so as to switch the connection to the positive electrode side or the negative electrode side of the energy storage device 7.

In FIG. 1A, the energy storage device 7 and the chopper 8 are disposed between the low potential side terminal of the inverter device 4 and a grounding point 6 of the DC voltage source in such a manner that the negative side terminal of the energy storage device 7 is connected to the low potential side terminal of the inverter device 4, and that the side (point A) of the switch 9, which side is not connected to the energy storage device 7, is connected to the grounding point 6 of the DC voltage source. Thereby, the voltage of the DC portion of the inverter device 4 becomes the sum of the overhead line voltage and the output voltage of the voltage adjustment device, so that the applied voltage of the inverter device 4 is increased.

Figure 1B:
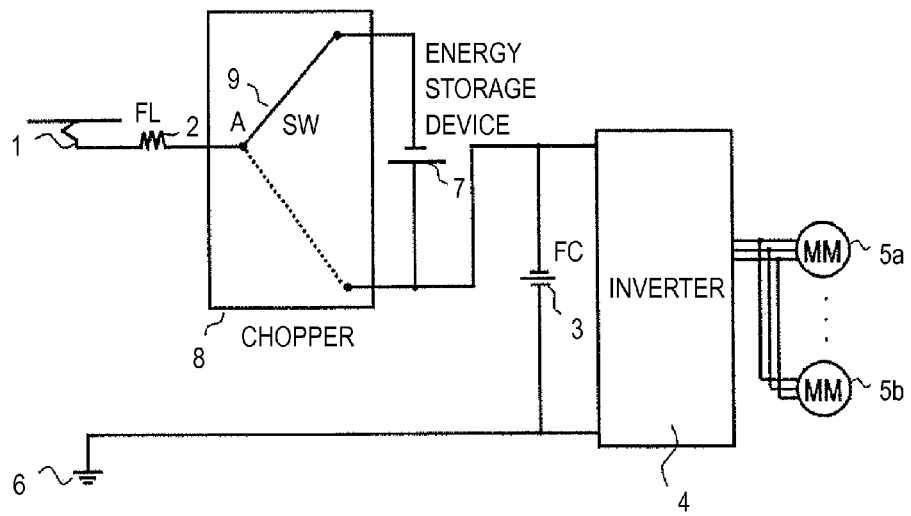
FIG. 1B is a view showing a basic configuration of the first embodiment of the drive device for the railway vehicle according to the present invention (in the case where an energy storage device is disposed on the positive electrode side of an inverter device)

Further, in FIG. 1B, the energy storage device 7 and the chopper 8 are disposed between the pantograph 1 and the high potential side terminal of the inverter device 4 in such a manner that the positive electrode side terminal of the energy storage device 7 is connected to the high potential side terminal of the inverter device 4, and that the side (point A) of the switch 9, which side is not connected to the energy storage device 7, is connected to the filter reactor (FL) 2. Thereby, the voltage of the DC portion of the inverter device 4 becomes the sum of the overhead line voltage and the output voltage of the voltage adjustment device, so that the applied voltage of the inverter device 4 is increased.

With the configurations shown in FIG. 1A and FIG. 1B, the regeneration braking force can be increased by increasing the voltage applied to the inverter device 4.

Here, a case where the number of the main motors driven by the inverter device 4 is two is described, but the number of main motors driven by the inverter device 4 is not limited and is suitably selected according to the type, and the like, of the railway vehicle.

Note that, in the following, the on and off of the switch 9 are defined such that the state where current is made to flow through the energy storage device 7 by the switch 9 is the off state (the position represented by the solid line in FIG. 1), and such that the state where current is prevented from flowing through the energy storage device 7 by the switch 9 is the on state (the state represented by the dotted line in FIG. 1).

Figure 2A:
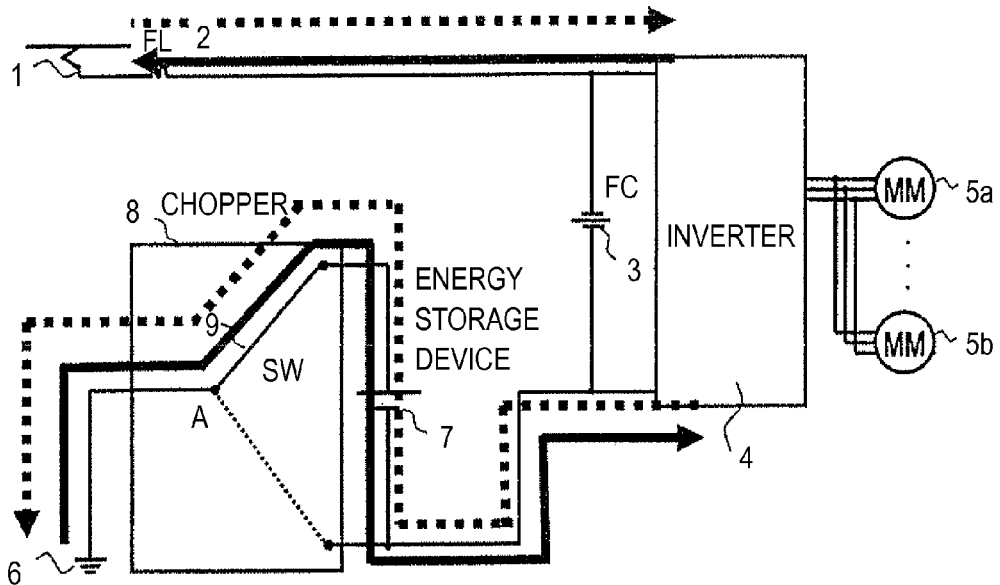
FIG. 2A is a view showing a flow of current at the time of regeneration operation of the first embodiment.
Figure 2B:
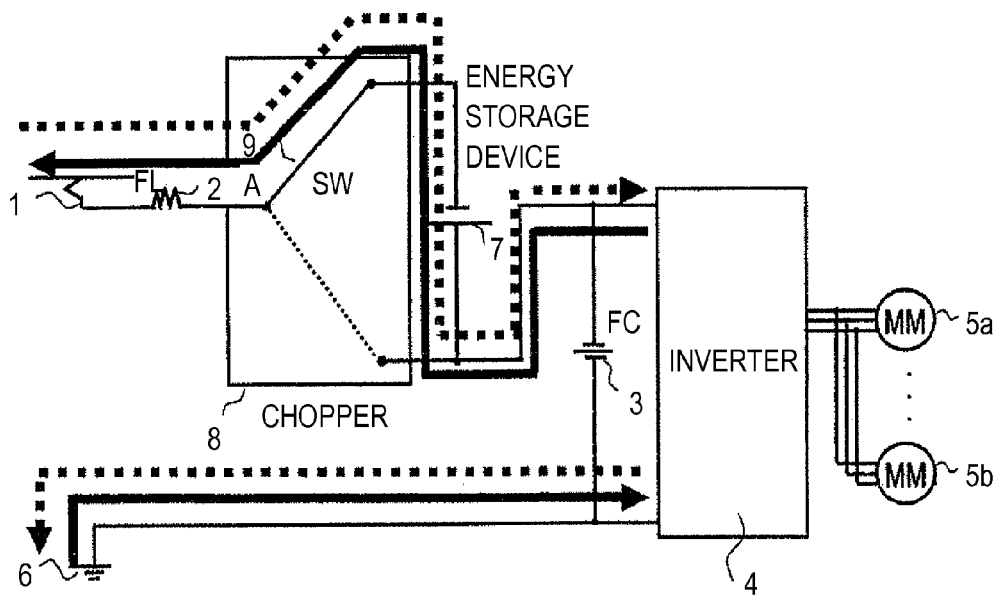
FIG. 2B is a view showing a flow of current at the time of power running operation of the first embodiment.

In FIG. 2A and FIG. 2B, the flowing direction of the current at the time of power running operation is represented by a dotted-line arrow and the flowing direction of the current at the time of regeneration operation is represented by a solid-line arrow respectively in correspondence with FIG. 1A and FIG. 1B.

As described above, in the case of the circuit configuration of FIG. 1, when the inverter device performs power running operation or regeneration operation in the off state of the switch 9, the power running current shown by the dotted line arrow or the regeneration current shown by the solid line arrow always flows through the energy storage device 7 as shown in FIG. 2. Therefore, there arises a problem that the over-discharge of the energy storage device 7 is caused at the time of power running operation and that the overcharge of the energy storage device 7 is caused at the time of regeneration operation.

At this time, the voltage of the DC portion of the inverter device 4 has a value resulting from always adding the voltage between terminals of the energy storage device 7 to the DC power source voltage (overhead line voltage). Therefore, when the energy storage device 7, in which the voltage between the terminals of the energy storage device 7 is not less than a value resulting from subtracting the DC power source voltage (overhead line voltage) from the withstand voltage of the inverter device 4, is used, the voltage of the DC portion of the inverter device 4 exceeds the withstand voltage of the inverter device 4. Therefore, there is a design limitation that it is necessary to use an energy storage device 7 in which the voltage between the terminals of the energy storage device 7 is not more than the value resulting from subtracting the DC power source voltage (overhead line voltage) from the withstand voltage of the inverter device 4.

Further, there is also a problem that, in the state where the off-state of the switch 9 is maintained, when the regeneration operation of the inverter device 4 is started and stopped, the voltage of the DC portion of the inverter device 4 has a value resulting from instantaneously adding and subtracting the voltage between the terminals of the energy storage device, as it is, to and from the DC power source voltage (overhead line voltage), and thereby an over-voltage or over current is also applied to the inverter device 4.

To cope with this, in the drive device for the railway vehicle as shown in FIG. 1, the operation start and stop sequences of the inverter device 4 and the chopper 8 at the time of the power running operation or the regeneration operation are defined as sequences shown in FIG. 3, and thereby the chopper 8 (switch 9) is always operated during the power running operation or the regeneration operation of the inverter device 4, so that the output voltage of the voltage adjustment device (current flowing through the energy storage device 7) is adjusted by the chopper 8.

Figure 3A:
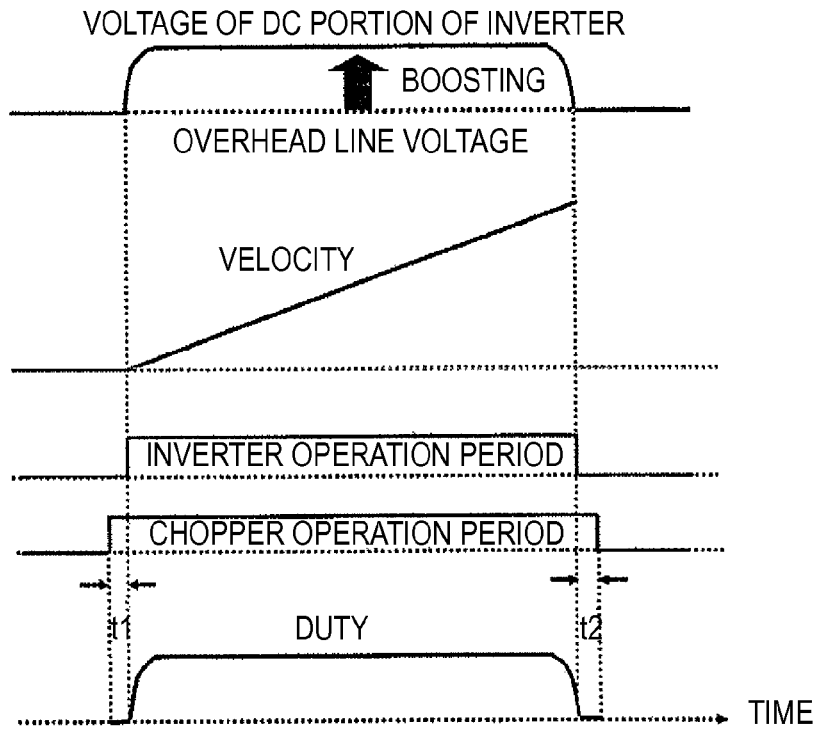
FIG. 3A is a view showing a control sequence at the time of power running operation of the first embodiment.
Figure 3B:
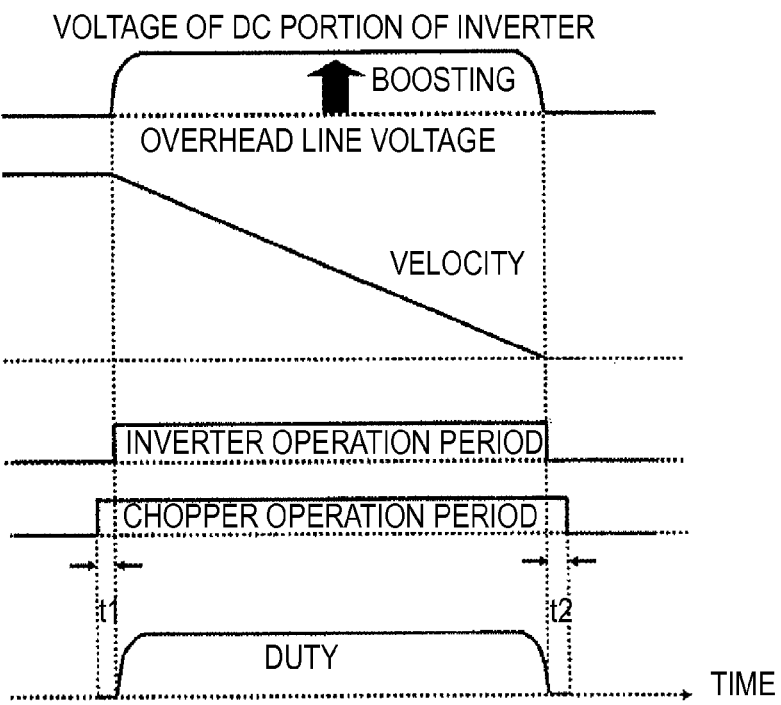
FIG. 3B is a view showing a control sequence at the time of regeneration operation of the first embodiment.

FIG. 3A and FIG. 3B respectively show the control sequence at the time of power running operation and the control sequence at the time of regeneration operation. In FIG. 3A and FIG. 3B, the voltage of the DC portion of the inverter, the velocity of the railway vehicle, the operation period of the inverter, the operation period of the chopper, and the chopper duty are shown in order from the top. Here, the chopper duty means a ratio of the off-time of the switch 9 of the chopper 8 with respect to the switching period of the switch 9. Further, reference character t1 in FIG. 3 denotes a time difference between the operation start of the inverter and the operation start of the chopper, and reference character t2 in FIG. 3 denotes a time difference between the operation stop of the inverter and the operation stop of the chopper.

In each of the power running operation shown in FIG. 3A and of the regeneration operation shown in FIG. 3B, the operation of the chopper 8 is started prior to the operation start timing of the inverter device 4 by the time t1, and when the operation of the inverter device 4 is stopped, the operation of the chopper 8 is stopped after the lapse of time t2 from the moment when the operation of the inverter device 4 is stopped. Thereby, the chopper 8 is surely operated at least during the operation period of the inverter device 4.

Figure 4A:
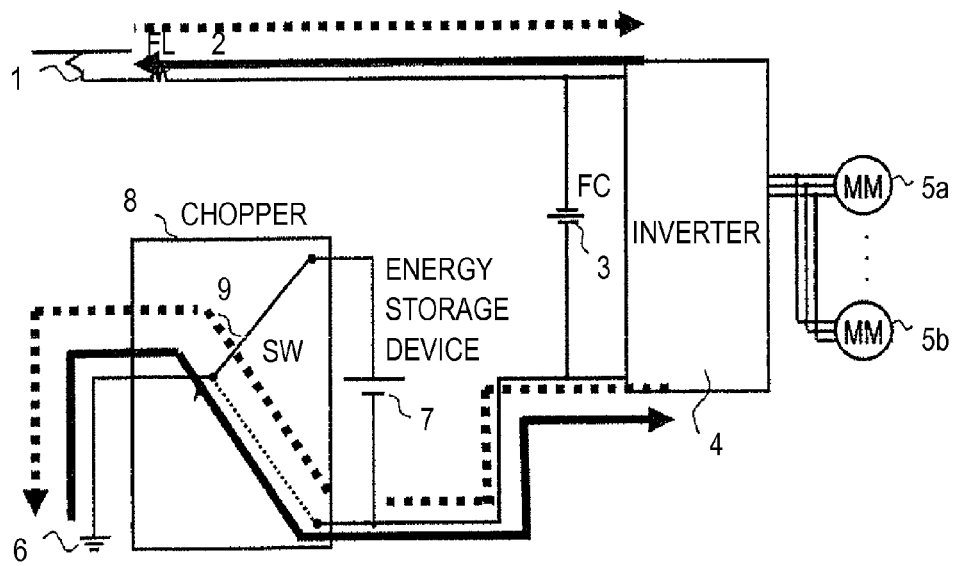
FIG. 4A is a view showing an operation of the first embodiment (corresponding to the circuit configuration shown in FIG. 1A)
Figure 4B:
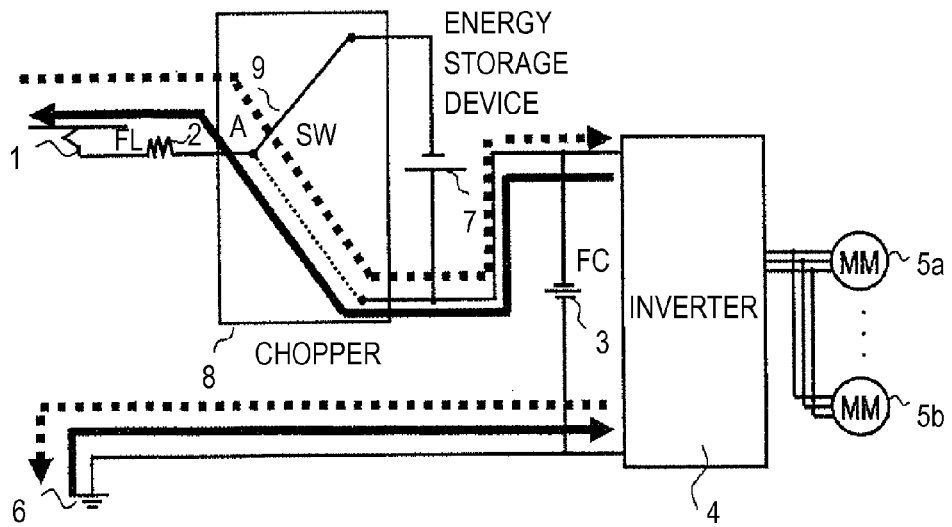
FIG. 4B is a view showing an operation of the first embodiment (corresponding to the circuit configuration shown in FIG. 1B)

Specifically, during power running or regeneration, when the power running operation or the regeneration operation of the inverter device 4 is started, the operation of the chopper 8 is started prior to the operation start timing of the inverter device 4 by the time t1. Thereby, the switch 9 of the chopper 8 is controlled so as to be turned on (the duty is set to 0%) to form a current path for preventing the power running current or the regeneration current from flowing through the energy storage device 7. Then, in this state, the power running operation or the regeneration operation of the inverter device 4 is started. Thereby, as shown in FIG. 4A corresponding to the circuit configuration of FIG. 1A, and as shown in FIG. 4B corresponding to the circuit configuration of FIG. 1B, when the operation of the inverter device 4 is started, the power running current or the regeneration current surely flows through the path so configured so to completely prevent the power running current or the regeneration current from flowing through the energy storage device 7. Thereafter, the output voltage of the voltage adjustment device is gradually increased by controlling the switch 9 of the chopper 8 so that the off-time (duty) of the switch 9 is gradually increased to thereby gradually increase the ratio of the power running current or the regeneration current flowing through the energy storage device 7.

On the other hand, in the present embodiment, when the power running operation or the regeneration operation of the inverter device 4 is stopped at the end of the power running operation or the regeneration operation, the output voltage of the voltage adjustment device is gradually reduced in such a manner that, immediately before the operation of the inverter device 4 is stopped, the switch 9 of the chopper 8 is controlled so that the on-time of the switch 9 is gradually increased to thereby gradually reduce the ratio of the power running current or the regeneration current flowing through the energy storage device 7. Thereafter, the switch 9 is finally set to be always turned on to form the current path for preventing the power running current or the regeneration current from flowing through the energy storage device 7, and the duty is maintained at 0%. Thereby, as shown in FIG. 4A corresponding to the circuit configuration of FIG. 1A, and as shown in FIG. 4B corresponding to the circuit configuration of FIG. 1B, when the operation of the inverter device 4 is stopped, the power running current or the regeneration current surely flows through the path so configured as to completely prevent the power running current or the regeneration current from flowing through the energy storage device 7. After the lapse of time t2 from the moment when the power running operation or the regeneration operation of the inverter device 4 is stopped in this state, the operation of the chopper 8 is stopped.

Here, in a railway vehicle, it generally takes about 10 to 100 ms from the time when a command to start the power running operation or the regeneration operation is issued by the notch operation in the driver's cab, to the time when the power running operation or the regeneration operation of the inverter device 4 is actually started. Therefore, when the operation of the chopper 8 is started in synchronization with the notch operation, it is possible to secure the time of 10 to 100 ms as the time t1. That is, it is only necessary that the time t1 is equal to or less than the time interval from the time when the command to start the power running operation or the regeneration operation is issued to the time when the power running operation or the regeneration operation of the inverter device is actually started, and that the operation of the chopper 8 is started within this time interval.

On the other hand, in the case where the operation of the inverter device 4 is stopped at the end of the power running operation or the regeneration operation, the power running current or the regeneration current is close to zero, and hence the operation of the chopper 8 may be stopped in synchronization with the time when the operation of the inverter device 4 is stopped. However, it is preferred that, as in the present embodiment, the time t2 be set to have a margin of several ms to enable the chopper 8 to be surely operated during the time when the inverter device 4 is operated.

As described above, with the present embodiment, it is possible to surely avoid the power running operation or the regeneration operation of the inverter device 4 in the state where the operation of the chopper 8 is stopped (in the off-state of the switch 9), and hence it is possible to prevent the over-discharge and overcharge of the energy storage device 7. Also, the output voltage of the voltage adjustment device is always controlled by the chopper 8, so that the restriction on the voltage between the terminals of the energy storage device 7 is removed, and hence the flexibility of selecting the energy storage device is improved. Further, it is possible to suppress an abrupt change in the voltage of the DC portion of the inverter device 4 at the time when the regeneration operation of the inverter device 4 is started and stopped, and hence it is also possible to prevent an over voltage or over current from being applied to the inverter device 4.

[Embodiment 2]

Figure 5:
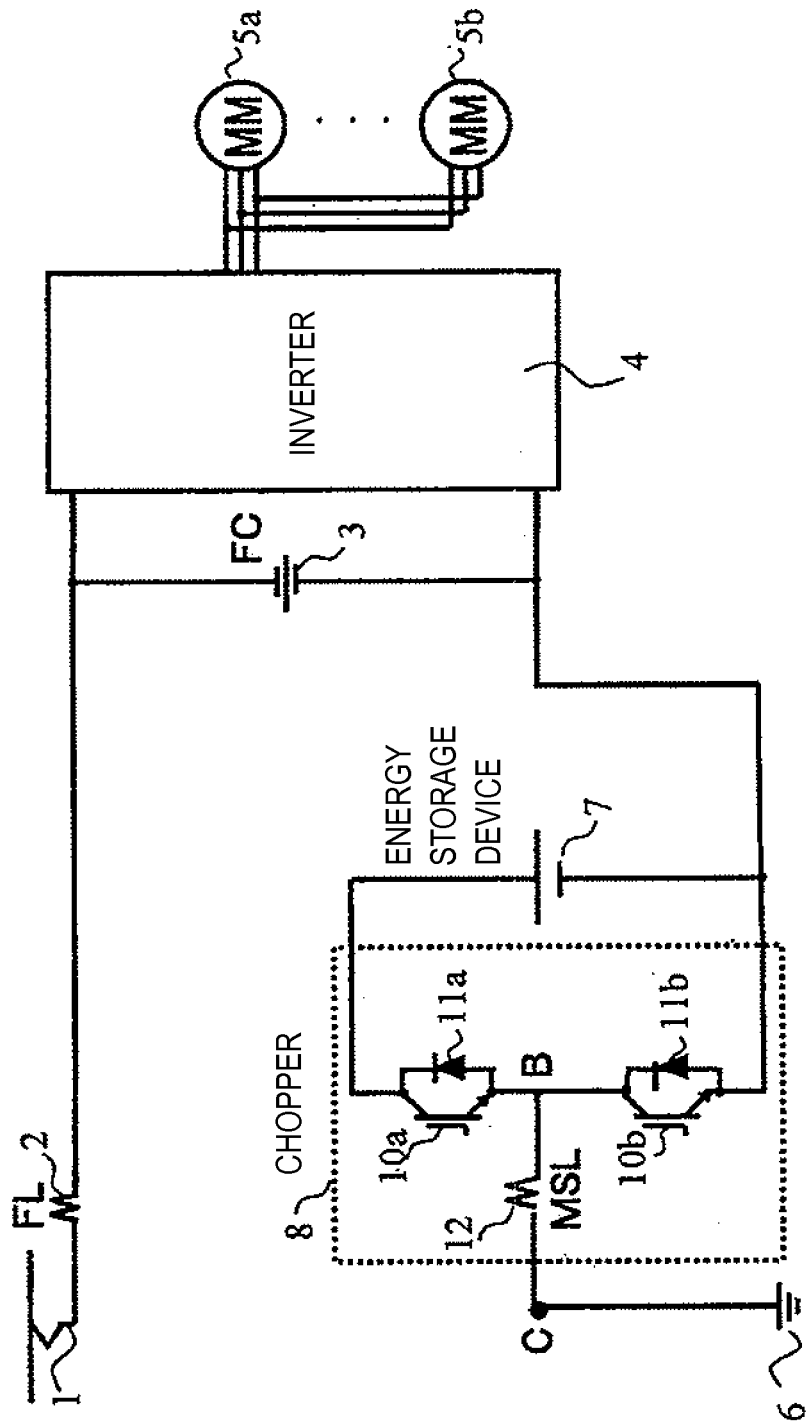
FIG. 5 is a view showing a basic configuration of a second embodiment of a drive device for a railway vehicle according to the present invention (in the case of a single-phase chopper)
Figure 9:
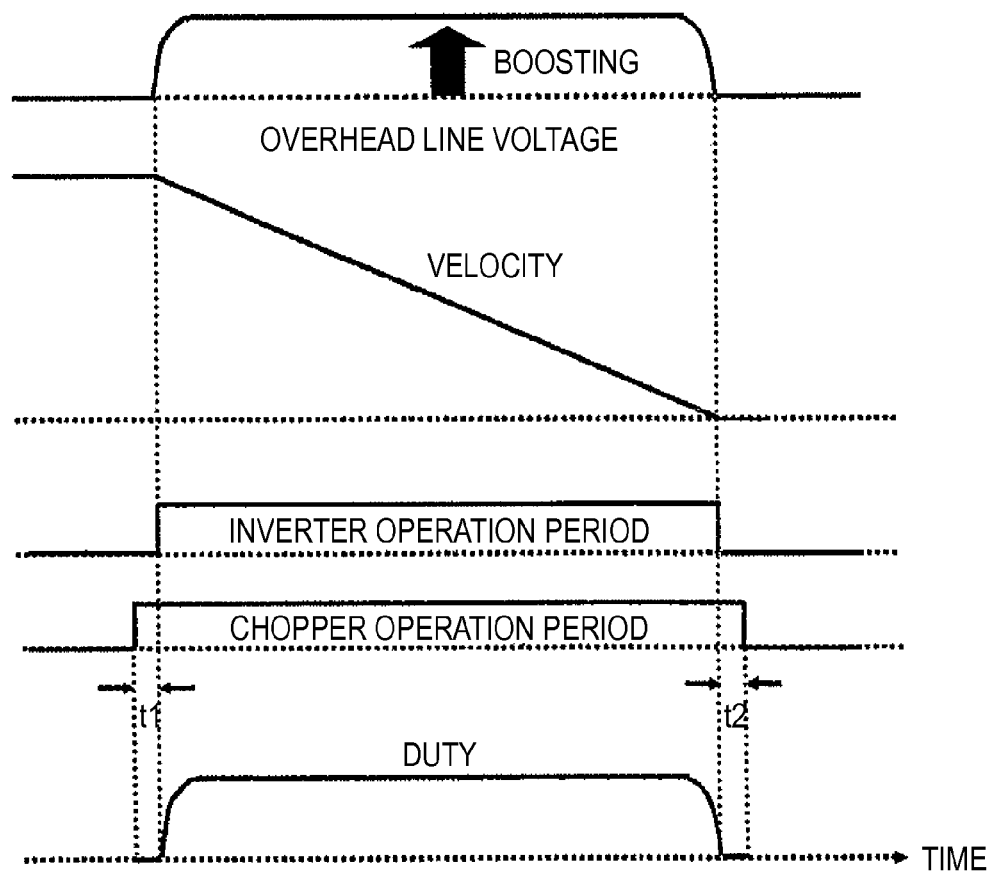
FIG. 9 is a view showing a control sequence of the second embodiment.

FIG. 5 shows a basic configuration of a second embodiment of a drive device for a railway vehicle, which is a subject of the present invention. FIG. 9 shows a control sequence at the time of regeneration operation in the present embodiment.

The basic configuration of the second embodiment is different from the basic configuration of the first embodiment shown in FIG. 1 in that the chopper 8 is not constituted by the switch 9, but is constituted by switching elements 10a and 10b which are current cutout devices respectively formed of semiconductor elements, diode elements 11a and 11b each of which is connected in parallel to the input and output terminals of each of the switching elements 10a and 10b in the direction opposite to the direction of conduction of each of the switching elements 10a and 10b, and a smoothing reactor (MSL) 12. Further, the energy storage device 7 and the chopper 8 are disposed between the low potential side terminal of the inverter device 4, and the grounding point 6 of the DC voltage source.

In more detail, as shown in FIG. 5, the second embodiment includes the pantograph 1 for receiving DC power from the DC voltage source, such as an overhead line, the LC circuit (filter circuit) constituted by the filter reactor (FL) 2 and the filter capacitor (FC) 3 for removing high frequency variations in the DC power received by the pantograph 1, the inverter device 4 for converting the DC power into AC power, at least one or more AC motors 5a and 5b driven by the inverter device 4, the chargeable and dischargeable energy storage device 7 (such as, for example, a battery and a capacitor), and the voltage adjustment device that adjusts the output voltage thereof by using the chopper 8 which uses the energy storage device 7 as a power source and which is constituted by the switching elements 10a and 10b connected in series between the positive and negative electrodes of the energy storage device 7, the diode elements 11a and 11b each connected in parallel to the input and output terminals of each of the switching elements 10a and 10b in the direction opposite to the direction of conduction of each of the switching elements 10a and 10b, and the smoothing reactor (MSL) 12 connected at the connecting position (hereinafter referred to as point B) of the switching element 10a and the switching element 10b.

Further, the negative electrode side terminal of the energy storage device 7 is connected to the low potential side terminal of the inverter device 4, and the terminal (point C) of the smoothing reactor (MSL) 12, which terminal is not the point B, is connected to the grounding point 6 of the DC voltage source. Thereby, the energy storage device 7 and the chopper 8 are disposed between the low potential side terminal of the inverter device 4 and the grounding point 6 of the DC voltage source. With this configuration, the voltage of the DC portion of the inverter device 4 becomes the sum of the overhead line voltage and the output voltage of the voltage adjustment device, and thereby the function of increasing the regeneration braking force can be realized.

Note that in FIG. 5, the switching element connected to the positive electrode side of the energy storage device 7 is described as the switching element 10a, and the switching element connected to the negative electrode side of the energy storage device 7 is described as the switching element 10b.

Here, a case where the number of the main motors driven by the inverter device 4 is two is described, but the number of the main motors driven by the inverter device 4 is not limited and is suitably selected according to the type, and the like, of the railway vehicle.

Further, in FIG. 5, the upper arm of the chopper 8 is constituted by the switching element 10a and the diode element 11a, and the lower arm of the chopper 8 is constituted by the switching element 10b and the diode element 11b. However, the upper arm of the chopper 8 may be configured only by a diode element, and the lower of the chopper 8 may be configured only by a switching element.

Figure 6:
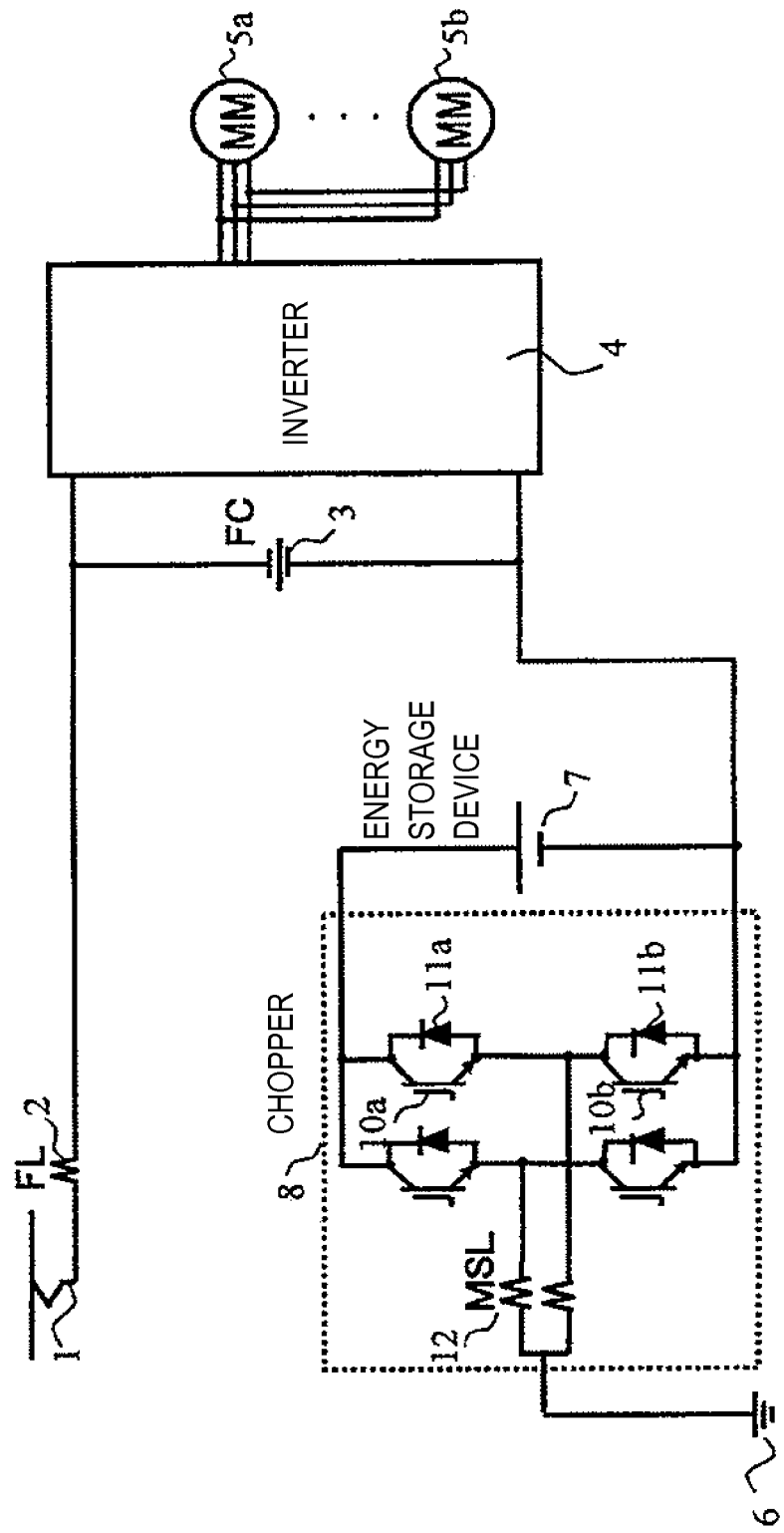
FIG. 6 is a view showing a basic configuration of the second embodiment of the drive device for the railway vehicle according to the present invention (in the case of a two-phase chopper)
Figure 7:
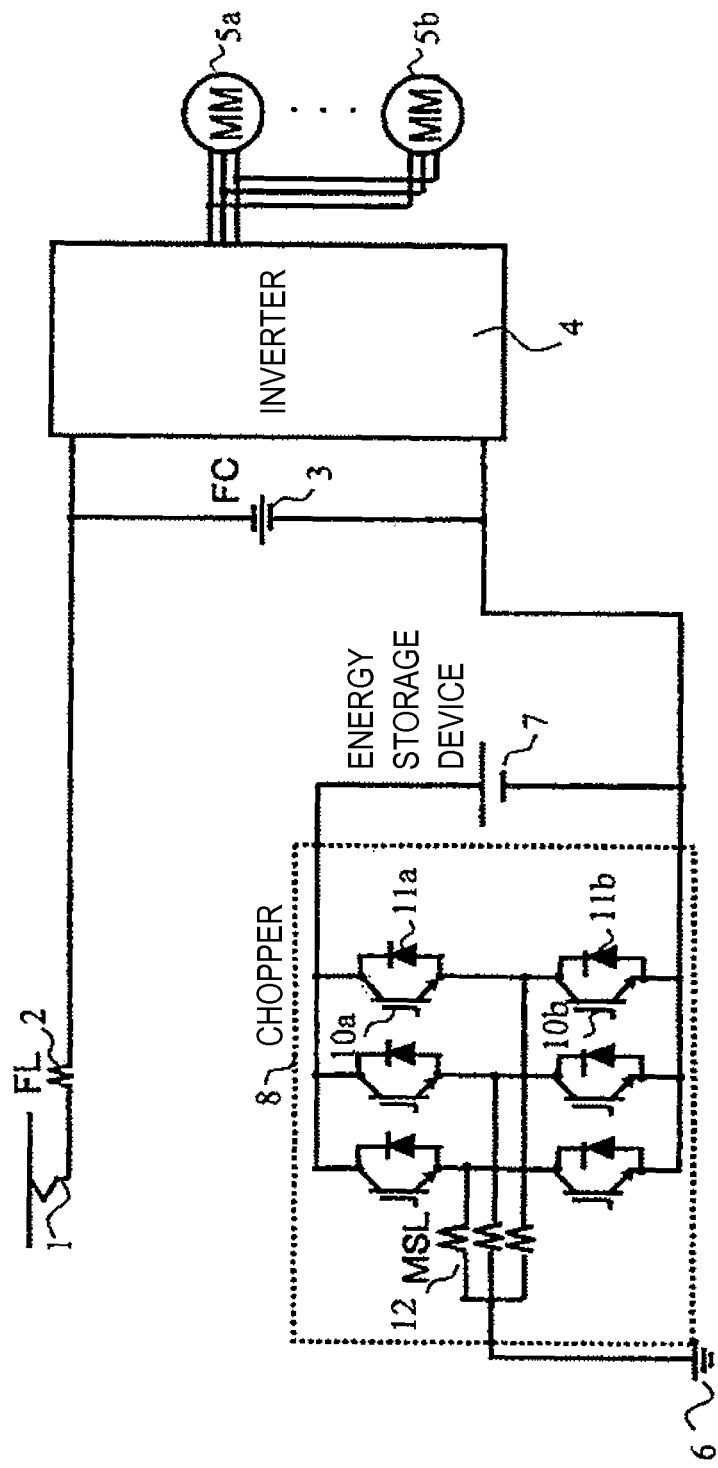
FIG. 7 is a view showing a basic configuration of the second embodiment of the drive device for the railway vehicle according to the present invention (in the case of a three-phase chopper)

Further, in FIG. 5, the chopper 8 is a single-phase chopper, the upper arm of which is constituted by the switching element 10a and the diode element 11a, and the lower arm of which is constituted by the switching element 10b and the diode element 11b. From the viewpoint of reducing ripple in battery current, the chopper 8 may also be formed as a two-phase chopper (FIG. 6) or a three-phase chopper (FIG. 7).

Further, in FIG. 5, two reactors of the filter reactor (FL) 2 and the smoothing reactor (MSL) 12 are used. However, the filter reactor (FL) 2 and the smoothing reactor (MSL) 12 are connected in series via the DC voltage source, and hence the smoothing reactor (MSL) 12 may also be removed.

Figure 8:
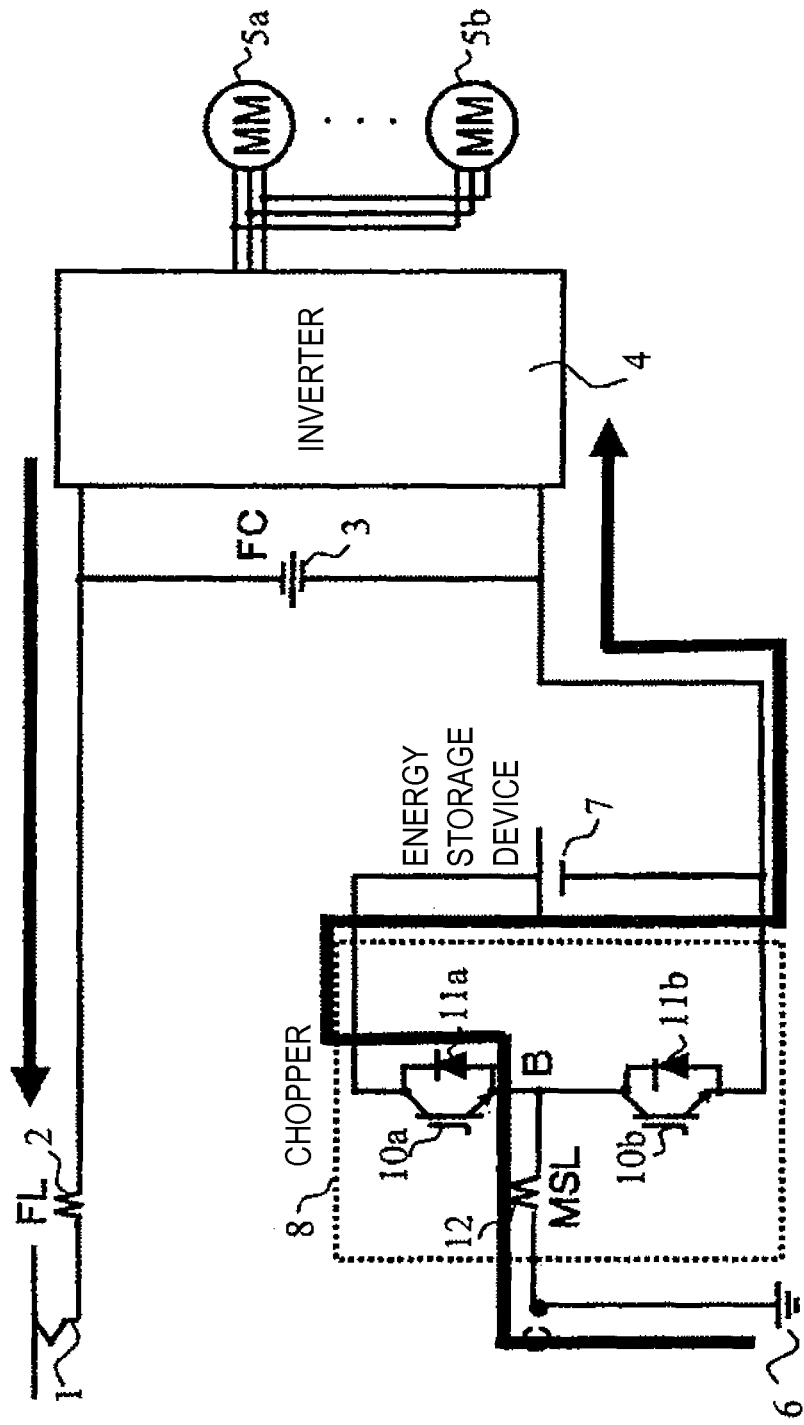
FIG. 8 is a view showing a flow of regeneration current of the second embodiment.

However, in the case of the circuit configuration of FIG. 5, there is a problem that, when the regeneration operation of the inverter device 4 is performed in the state where the operation of the chopper 8 is stopped, that is, where both the switching elements 10*a* and 10*b* are maintained to be turned off, the regeneration current always flows through the energy storage device 7 via the diode element 11*a* as shown by the solid line of FIG. 8, and thereby the energy storage device 7 is overcharged.

At this time, the voltage of the DC portion of the inverter device 4 has a value resulting from always adding the voltage between terminals of the energy storage device 7 to the DC power supply voltage (overhead line voltage). Therefore, when the energy storage device 7, in which the voltage between the terminals of the energy storage device 7 is not less than a value resulting from subtracting the DC power source voltage (overhead line voltage) from the withstand voltage of the inverter device 4, is used, the voltage of the DC portion of the inverter device 4 exceeds the withstand voltage of the inverter device 4. Therefore, there is a design limitation that it is necessary to use an energy storage device 7 in which the voltage between the terminals of the energy storage device 7 is not more than the value resulting from subtracting the DC power source voltage (overhead line voltage) from the withstand voltage of the inverter device 4.

Further, there is also a problem that, when the regeneration operation of the inverter device 4 is started and stopped in the state where the operation of the chopper 8 is stopped, the voltage of the DC portion of the inverter device 4 has a value resulting from instantaneously adding and subtracting the voltage between the terminals of the energy storage device, as it is, to and from the DC power source voltage (overhead line voltage), and thereby an over-voltage or over current is also applied to the inverter device 4.

To cope with this, in the drive device for the railway vehicle as shown in FIG. 5, the operation start and stop sequences of the inverter device 4 and the chopper 8 at the time of the regeneration operation are defined as sequences as shown in FIG. 9, and the switching elements 10*a* and 10*b* of the chopper 8 are always operated during the regeneration operation of the inverter device 4, so that the output voltage of the voltage adjustment device (current flowing through the energy storage device 7) is adjusted by the chopper 8.

FIG. 9 shows a control sequence at the time of regeneration operation. In FIG. 9, the voltage of the DC portion of the inverter, the velocity of the railway vehicle, the operation period of the inverter, the operation period of the chopper, and the chopper duty are shown in order from the top. Here, the chopper duty means a ratio of the off-time of the switching element 10*b* with respect to the switching period of the switching elements 10*a* and 10*b* of the chopper 8. Further, reference character t1 in FIG. 9 denotes a time difference between the operation start of the inverter and the operation start of the chopper, and reference character t2 in FIG. 9 denotes a time difference between the operation stop of the inverter and the operation stop of the chopper.

As shown in FIG. 9, the operation of the chopper 8 is started prior to the operation start timing of the inverter device 4 by the time t1, and when the operation of the inverter device 4 is stopped, the operation of the chopper 8 is stopped after the lapse of time t2 from the moment when the operation of the inverter device 4 is stopped. Thereby, the chopper 8 is surely operated at least during the operation period of the inverter device 4.

Figure 10:
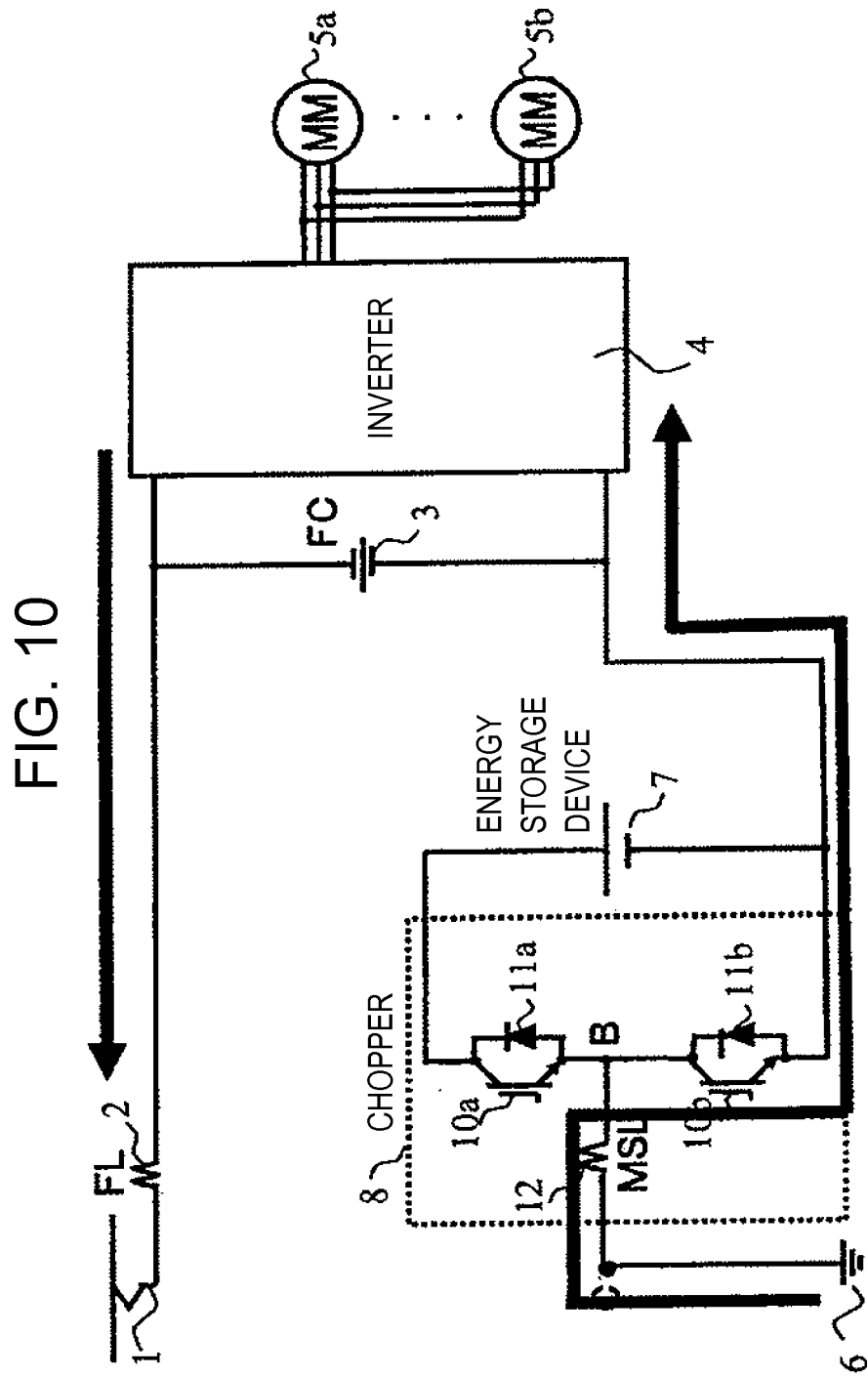
FIG. 10 is a view showing an operation of the second embodiment.

Specifically, in the regeneration operation, in the case where the regeneration operation of the inverter device 4 is started, the operation of the chopper 8 is started prior to the operation start timing of the inverter device 4 by the time t1. Thereby, the switching elements 10*a* and 10*b* of the chopper 8 are controlled so that the switching element 10*b* is always turned on and fully conducted (the duty is set to 0%) to form a current path for preventing the regeneration current from flowing through the energy storage device 7. Then, in this state, the regeneration operation of the inverter device 4 is started. Thereby, as shown by the solid line of FIG. 10, when the operation of the inverter device 4 is started, the regeneration current surely flows through the path so configured as to completely prevent the regeneration current from flowing through the energy storage device 7. Thereafter, the output voltage of the voltage adjustment device is gradually increased by controlling the switching elements 10*a* and 10*b* of the chopper 8 so that the off-time (duty) of the switching element 10*b* is gradually increased to thereby gradually increase the ratio of the regeneration current flowing through the energy storage device 7.

On the other hand, in the present embodiment, in the case where the regeneration operation of the inverter device 4 is stopped at the end of the regeneration operation, the output voltage of the voltage adjustment device is gradually reduced in such a manner that, immediately before the operation of the inverter device 4 is stopped, the switching elements 10*a* and 10*b* of the chopper 8 are controlled so that the on-time of the switching element 10*b* is gradually increased, so as to thereby gradually reduce the ratio of the regeneration current flowing through the energy storage device 7. Thereafter, the switching element 10*b* is finally set to be always turned on and fully conducted (the duty: 0%) so as to form the current path for preventing the regeneration current from flowing through the energy storage device 7. Thereby, as shown by the solid line of FIG. 10, when the operation of the inverter device 4 is stopped, the regeneration current surely flows through the path so configured as to completely prevent the regeneration current from flowing through the energy storage device 7. After the lapse of time t2 from the moment when the regeneration operation of the inverter device 4 is stopped in this state, the operation of the chopper 8 is stopped.

Here, in a railway vehicle, it generally takes about 10 to 100 ms from the time when a command to start the regeneration operation is issued by the notch operation in the driver's cab, to the time when the regeneration operation of the inverter device 4 is actually started. Therefore, when the operation of the chopper 8 is started in synchronization with the notch operation, it is possible to secure the time of 10 to 100 ms as the time t1. That is, it is only necessary that the time t1 is equal to or less than the time interval from the time when the command to start the regeneration operation is issued to the time when the regeneration operation of the inverter device is actually started, and that the operation of the chopper 8 is started within this time interval.

On the other hand, in the case where the regeneration operation of the inverter device 4 is stopped at the end of the regeneration operation, the regeneration current is close to zero, and hence the operation of the chopper 8 may be stopped in synchronization with the time when the operation of the inverter device 4 is stopped. However, it is preferred that, as in the present embodiment, the time t2 be set to have a margin of several ms to enable the chopper 8 to be surely operated during the time when the inverter device 4 is operated.

With the second embodiment, it is possible to surely avoid the regeneration operation of the inverter device 4 in the state where the operation of the switching elements 10*a* and 10*b* of the chopper 8 is stopped, that is, where both the switching elements 10a and 10b are maintained to be turned off. Thereby, it is possible to prevent the energy storage device 7 from being overcharged.

Also, the output voltage of the voltage adjustment device is always controlled by the chopper 8, so that the restriction on the voltage between the terminals of the energy storage device 7 is removed, and hence the flexibility of selecting the energy storage device is improved. Further, it is possible to suppress an abrupt change in the voltage of the DC portion of the inverter device 4 at the time when the regeneration operation of the inverter device 4 is started and stopped, and hence it is also possible to prevent an over voltage or over current from being applied to the inverter device 4.

[Embodiment 3]

Figure 11:
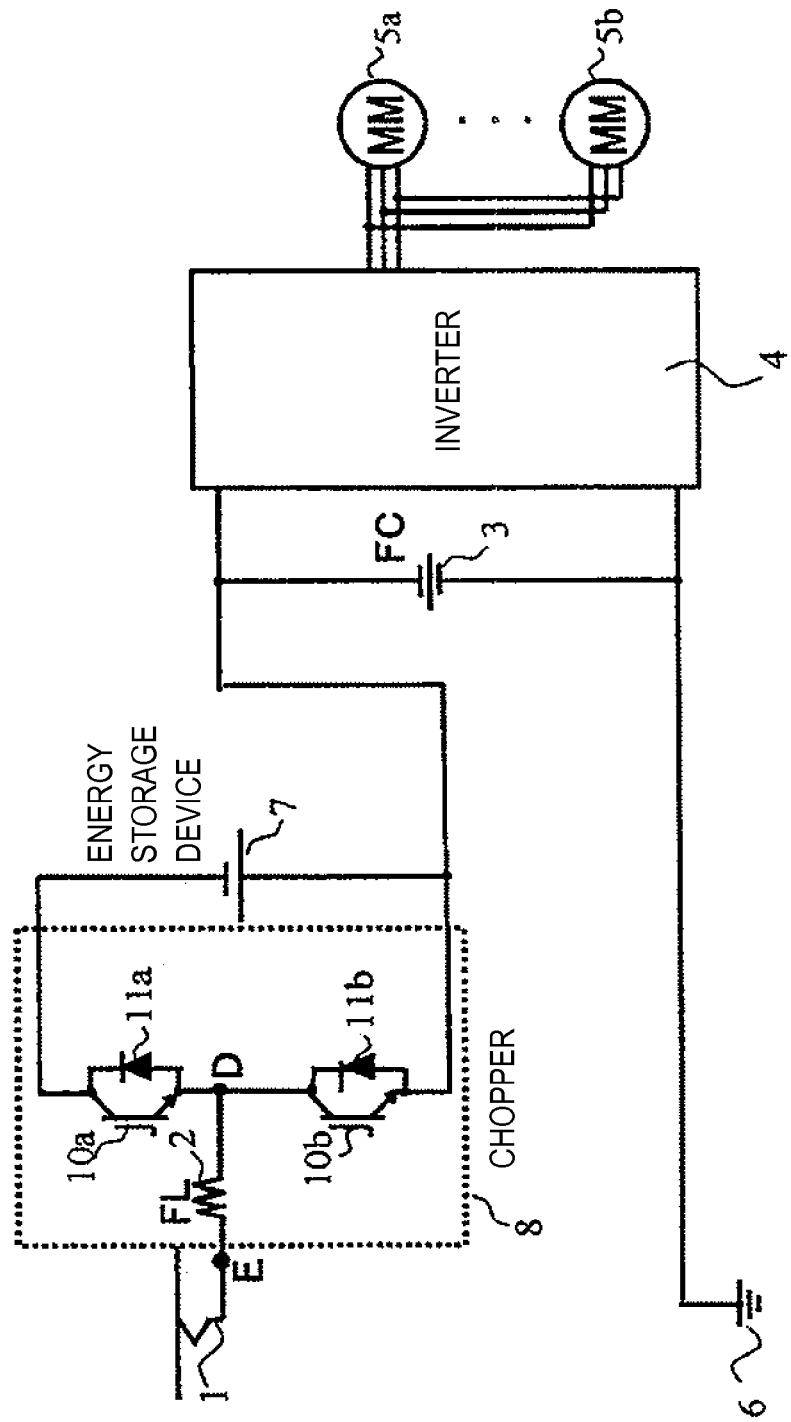
FIG. 11 is a view showing a basic configuration of a third embodiment of a drive device for a railway vehicle according to the present invention (in the case of a single-phase chopper)
Figure 15:
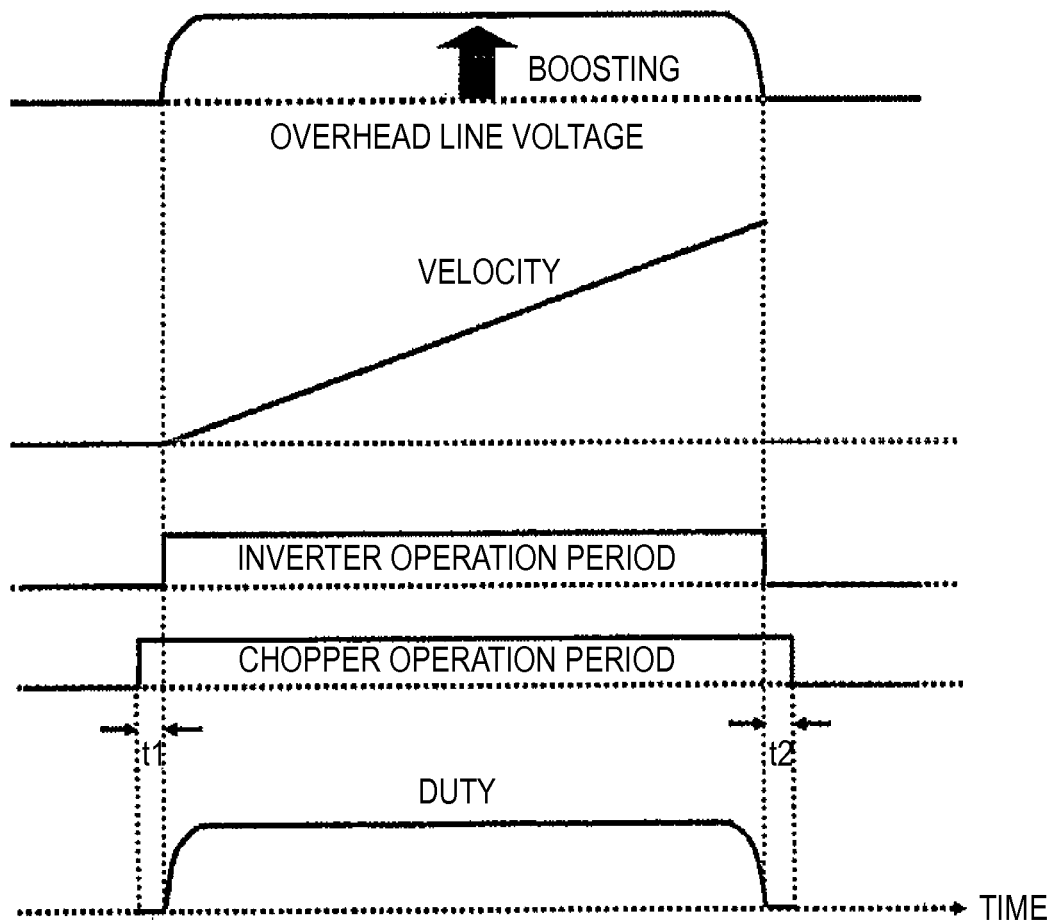
FIG. 15 is a view showing a control sequence of the third embodiment.

FIG. 11 shows a basic configuration of a third embodiment of a drive device for a railway vehicle, which is a subject of the present invention. FIG. 15 shows a control sequence at the time of power running operation in the present embodiment.

The basic configuration of the third embodiment is different from the basic configuration of the second embodiment shown in FIG. 5 in that the energy storage device 7 and the chopper 8 are not disposed between the low potential side terminal of the inverter device 4 and the grounding point 6 of the DC voltage source, but are disposed between the pantograph 1 for receiving DC power from the DC voltage source and the high potential side terminal of the inverter device 4.

In more detail, as shown in FIG. 11, the third embodiment includes the pantograph 1 for receiving DC power from the DC voltage source, such as an overhead line, the filter capacitor (FC) 3 for removing high frequency variations in the DC power received by the pantograph 1, the inverter device 4 for converting the DC power into AC power, at least one or more AC motors 5a and 5b driven by the inverter device 4, the chargeable and dischargeable energy storage device 7 (such as, for example, a battery and a capacitor), and the voltage adjustment device that adjusts the output voltage thereof by using the chopper 8 which uses the energy storage device 7 as a power source and which is constituted by the switching elements 10a and 10b (current cutout devices formed of semiconductor elements) connected in series between the positive and negative electrodes of the energy storage device 7, the diode elements 11a and 11b each connected in parallel to the input and output terminals of each of the switching elements 10a and 10b in the direction opposite to the direction of conduction of each of the switching elements 10a and 10b, and the filter reactor (FL) 2 connected at the connecting position (hereinafter referred to as point D) of the switching element 10a and the switching element 10b.

Further, the positive electrode side terminal of the energy storage device 7 is connected to the high potential side terminal of the inverter device 4, and the terminal (point E) of the filter reactor (FL) 2, which terminal is not the point D, is connected to the pantograph 1. Thereby, the energy storage device 7 and the chopper 8 are disposed between the pantograph 1 and the high potential side terminal of the inverter device 4. With this configuration, the voltage of the DC portion of the inverter device 4 becomes the sum of the overhead line voltage and the output voltage of the voltage adjustment device, and thereby the function of increasing the regeneration braking force can be realized.

Note that in FIG. 11, the switching element connected to the negative electrode side of the energy storage device 7 is described as the switching element 10a, and the switching element connected to the positive electrode side of the energy storage device 7 is described as the switching element 10b.

Here, a case where the number of the main motors driven by the inverter device 4 is two is described, but the number of the main motors driven by the inverter device 4 is not limited and is suitably selected according to the type, and the like, of the railway vehicle.

Figure 12:
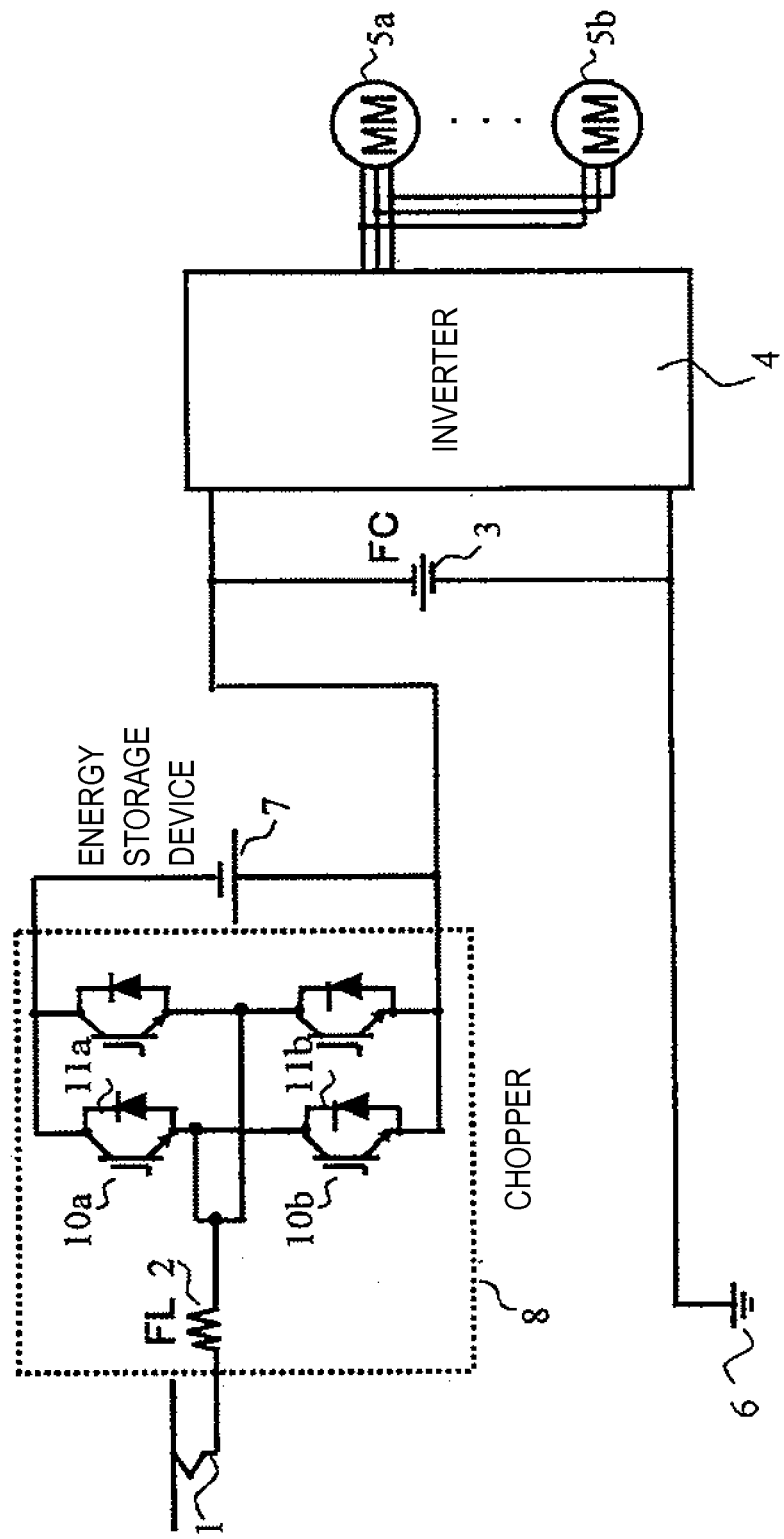
FIG. 12 is a view showing a basic configuration of the third embodiment of the drive device for the railway vehicle according to the present invention (in the case of a two-phase chopper)
Figure 13:
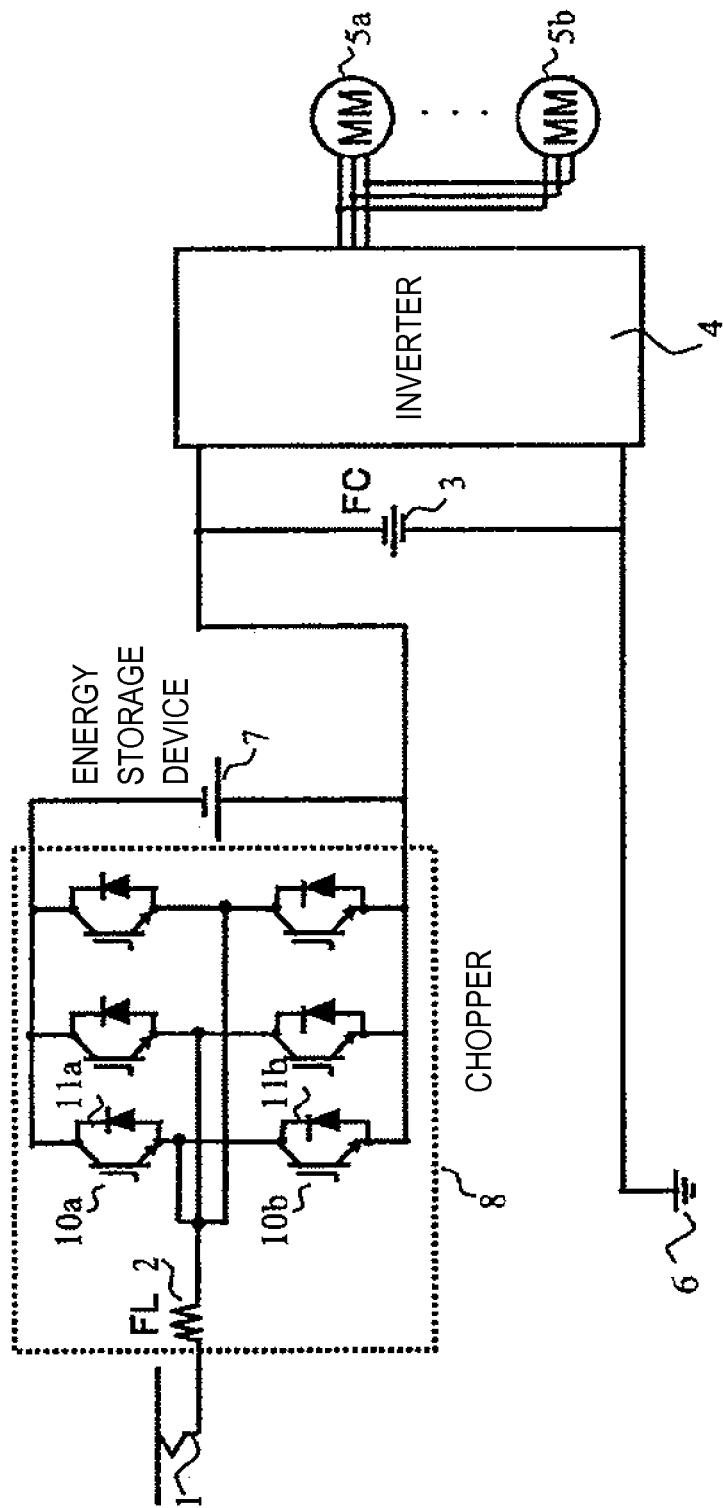
FIG. 13 is a view showing a basic configuration of the third embodiment of the drive device for the railway vehicle according to the present invention (in the case of a three-phase chopper)

Further, in FIG. 11, the chopper 8 is a single-phase chopper, the upper arm of which is constituted by the switching element 10a and the diode element 11a, and the lower arm of which is constituted by the switching element 10b and the diode element 11b. From the viewpoint of reducing ripple in battery current, the chopper 8 may also be formed as a two-phase chopper (FIG. 12) or a three-phase chopper (FIG. 13).

Figure 14:
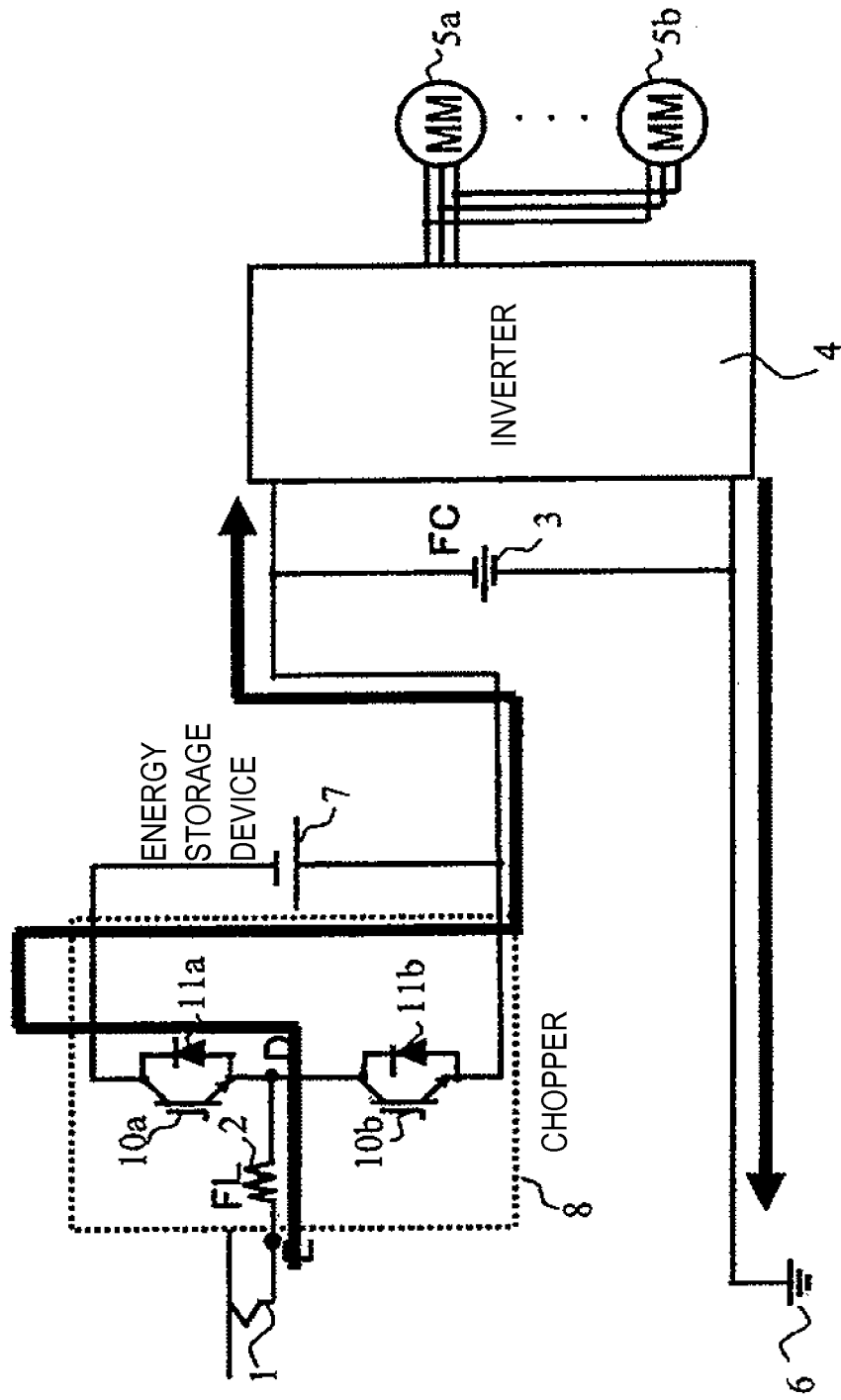
FIG. 14 is a view showing a flow of power running current of the third embodiment.

However, in the case of the circuit configuration of FIG. 11, there is a problem that, when the power running operation of the inverter device 4 is performed in the state where the operation of the chopper 8 is stopped, that is, where both the switching elements 10a and 10b are maintained to be turned off, the power running current always flows through the energy storage device 7 via the diode element 11a as shown by the solid line in FIG. 14, and thereby the energy storage device 7 is over-discharged.

At this time, the voltage of the DC portion of the inverter device 4 has a value resulting from always adding the voltage between terminals of the energy storage device 7 to the DC power supply voltage (overhead line voltage). Therefore, when the energy storage device 7, in which the voltage between the terminals of the energy storage device 7 is not less than a value resulting from subtracting the DC power source voltage (overhead line voltage) from the withstand voltage of the inverter device 4, is used, the voltage of the DC portion of the inverter device 4 exceeds the withstand voltage of the inverter device 4. Therefore, as described above, there is a design limitation that it is necessary to use an energy storage device 7 in which the voltage between the terminals of the energy storage device 7 is not more than the value resulting from subtracting the DC power source voltage (overhead line voltage) from the withstand voltage of the inverter device 4.

Further, there is also a problem that, when the power running operation of the inverter device 4 is started and stopped in the state where the operation of the chopper 8 is stopped, the voltage of the DC portion of the inverter device 4 has a value resulting from instantaneously adding and subtracting the voltage between the terminals of the energy storage device, as it is, to and from the DC power source voltage (overhead line voltage), and thereby an over-voltage or over current is applied to the inverter device 4.

To cope with this, in the drive device for the railway vehicle as shown in FIG. 11, the operation start and stop sequences of the inverter device 4 and the chopper 8 at the time of the power running operation are defined as sequences shown in FIG. 15, and the switching elements 10a and 10b of the chopper 8 are always operated during the power running operation of the inverter device 4, so that the output voltage of the voltage adjustment device (current flowing through the energy storage device 7) is adjusted by the chopper 8.

FIG. 15 shows a control sequence at the time of power running operation. In FIG. 15, the voltage of the DC portion of the inverter, the velocity of the railway vehicle, the operation period of the inverter, the operation period of the chopper, and the chopper duty are shown in order from the top. Here, the chopper duty means a rate of the on-time of the switching element 10a with respect to the switching period of the switching elements 10a and 10b of the chopper 8. Further, reference character t1 in FIG. 15 denotes a time difference between the operation start of the inverter and the operation start of the chopper, and reference character t2 in FIG. 15 denotes a time difference between the operation stop of the inverter and the operation stop of the chopper.

As shown in FIG. 15, the operation of the chopper 8 is started prior to the operation start timing of the inverter device 4 by the time t1, and when the operation of the inverter device 4 is stopped, the operation of the chopper 8 is stopped after the lapse of time t2 from the moment when the operation of the inverter device 4 is stopped. Thereby, the chopper 8 is surely operated at least during the operation period of the inverter device 4.

Specifically, in the power running operation, in the case where the power running operation of the inverter device 4 is started, the operation of the chopper 8 is started prior to the operation start timing of the inverter device 4 by the time t1. Thereby, the switching elements 10a and 10b of the chopper 8 are controlled so that the switching element 10b is always turned on (the duty is set to 0%) to form a current path for preventing the power running current from flowing through the energy storage device 7. Then, in this state, the power running operation of the inverter device 4 is started. Thereby, as shown by the solid line of FIG. 16, the power running current surely flows through the path configured to completely prevent the power running current from flowing through the energy storage device 7. Thereafter, the output voltage of the voltage adjustment device is gradually increased by controlling the switching elements 10a and 10b of the chopper 8 so that the off-time (duty) of the switching element 10b is gradually increased to thereby gradually increase the ratio of the power running current flowing through the energy storage device 7.

On the other hand, in the present embodiment, in the case where the power running operation of the inverter device 4 is stopped at the end of the power running operation, the output voltage of the voltage adjustment device is gradually reduced in such a manner that, immediately before the operation of the inverter device 4 is stopped, the switching elements 10a and 10b of the chopper 8 are controlled so that the on-time of the switching element 10b is gradually increased, so as to thereby to gradually reduce the ratio of the power running current flowing through the energy storage device 7. Thereafter, the switching element 10b is finally set to be always turned on and fully conducted (the duty: 0%) so as to form the current path for preventing the power running current from flowing through the energy storage device 7.

Figure 16:
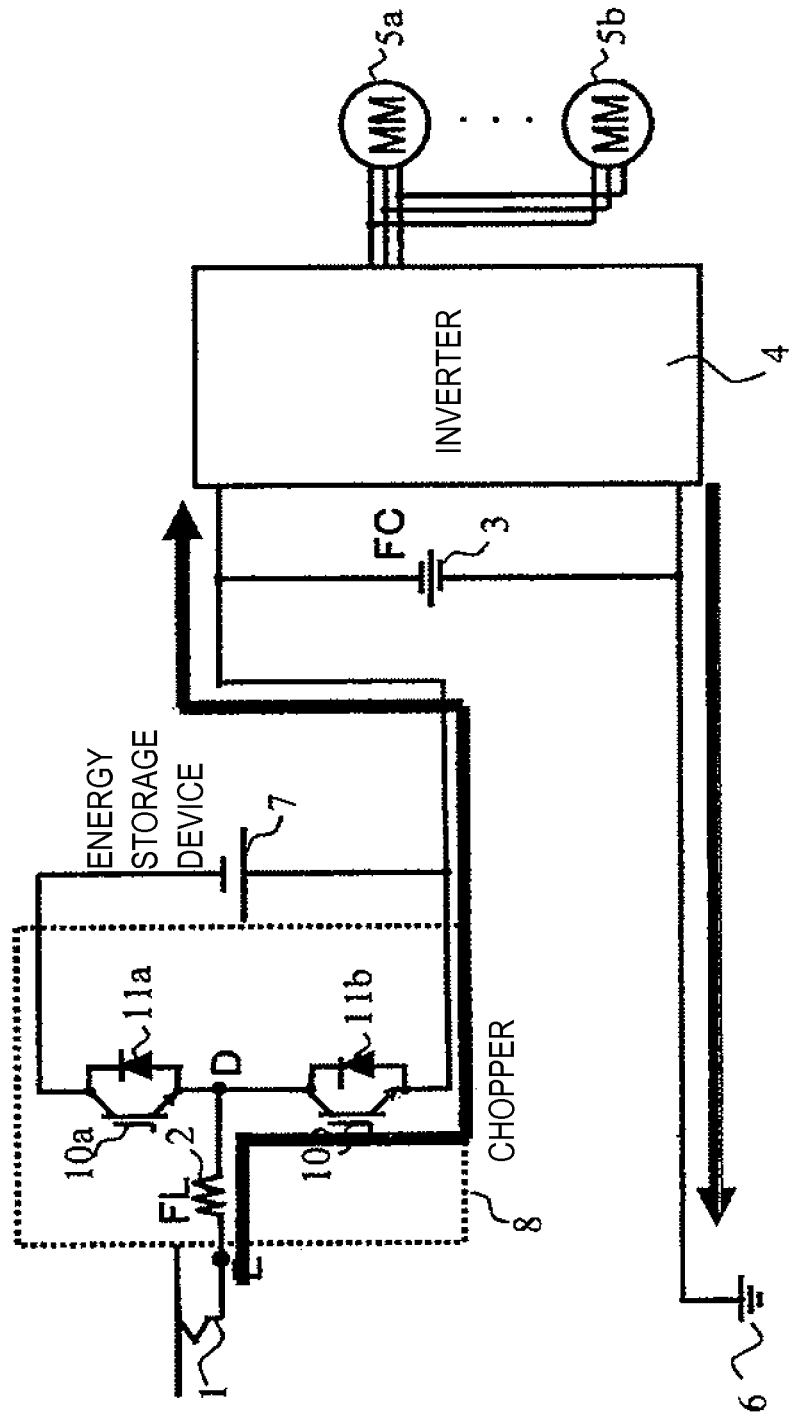
FIG. 16 is a view showing an operation of the third embodiment.

Thereby, as shown by the solid line of FIG. 16, when the operation of the inverter device 4 is stopped, the power running current surely flows through the path so configured as to completely prevent the power running current from flowing through the energy storage device 7. After the lapse of time t2 from the moment when the operation of the inverter device 4 is stopped in this state, the operation of the chopper 8 is stopped.

Here, in a railway vehicle, it generally takes about 10 to 100 ms from the time when a command to start the power running operation is issued by the notch operation in the driver's cab, to the time when the power running operation of the inverter device is actually started. Therefore, when the operation of the chopper 8 is started in synchronization with the notch operation, it is possible to secure the time of 10 to 100 ms as the time t1. That is, it is only necessary that the time t1 is equal to or less than the time interval from the time when the command to start the power running operation is issued, to the time when the power running operation of the inverter device is actually started, and that the operation of the chopper 8 is started within this time interval.

On the other hand, in the case where the power running operation of the inverter device 4 is stopped at the end of the power running operation, the power running current is close to zero, and hence the operation of the chopper 8 may be stopped in synchronization with the time when the operation of the inverter device 4 is stopped. However, it is preferred that, as in the present embodiment, the time t2 be set to have a margin of several ms to enable the chopper 8 to be surely operated during the time when the inverter device 4 is operated.

With the third embodiment, it is possible to surely avoid the power running operation of the inverter device 4 in the state where the operation of the switching elements 10a and 10b of the chopper 8 is stopped, that is, where both the switching elements 10a and 10b are maintained to be turned off. Thereby, it is possible to prevent the energy storage device 7 from being over-discharged.

Also, the output voltage of the voltage adjustment device is always controlled by the chopper 8, so that the restriction on the voltage between the terminals of the energy storage device 7 is removed, and hence the flexibility of selecting the energy storage device is improved. Further, it is possible to suppress an abrupt change in the voltage of the DC portion of the inverter device 4 at the time when the power running operation of the inverter device 4 is started and stopped, and hence it is also possible to prevent an over voltage or over current from being applied to the inverter device 4.

As described above, according to the present invention, when the power running operation or the regeneration operation of the inverter device is started, the operation of the chopper is started prior to the start of the power running operation or the regeneration operation of the inverter device, and when the power running operation or the regeneration operation of the inverter device is stopped, the operation of the chopper is stopped later than the stopping of the power running operation or the regeneration operation of the inverter device. Thereby, the chopper is surely operated at least during the operation period of the inverter device, and the output voltage of the voltage adjustment device (current flowing through the energy storage device) is adjusted by the chopper, so that the over-discharge at the time of power running operation or the overcharge at the time of regeneration operation can be prevented, and also the flexibility of the energy storage device can be increased. Therefore, the present invention is expected to be widely adopted as a drive device for a railway vehicle, which can maximize the regeneration efficiency of the railway vehicle.

What is claimed is:

1. A drive device for a railway vehicle comprising:
an inverter device for converting DC power obtained from a DC power source into AC power;
at least one or more AC motors driven by the inverter device;
a chargeable and dischargeable energy storage device; and
a voltage adjustment device that adjusts the output voltage thereof by using a current control device disposed between the positive and negative electrodes of the energy storage device and configured to switch the connection to the positive electrode side or the negative electrode side of the energy storage device, and
wherein the drive device is configured such that the output voltage of the voltage adjustment device is added to the voltage of the DC voltage source, and thereby the voltage applied to the inverter device is increased to increase the regeneration braking force,
wherein the output voltage of the voltage adjustment device is adjusted at least during the period of power running operation or regeneration operation of the inverter device in such a manner that, when the power running operation or the regeneration operation of the inverter device is started, the operation of the current control device is started prior to the start of the power running operation or the regeneration operation of the inverter device, and when the power running operation or the regeneration operation of the inverter device is stopped, the operation of the current control device is stopped later than the stopping of the power running operation or the regeneration operation of the inverter device.

2. The drive device for the railway vehicle according to claim 1,
wherein when the power running operation or the regeneration operation of the inverter device is started, the current control device is operated beforehand so as to form a current path for preventing the power running current flowing into the AC motor or the regeneration current flowing from the AC motor from flowing through the energy storage device, and then the power running operation or the regenerative operation of the inverter device is started.

3. The drive device for the railway vehicle according to claim 2,
wherein when the power running operation or the regeneration operation of the inverter device is started, the power running operation or the regeneration operation of the inverter device is started in the state where the current path for preventing the power running current or the regeneration current from flowing through the energy storage device is formed beforehand, and then the output voltage of the voltage adjustment device is gradually increased by controlling the current control device so as to gradually increase the ratio of the power running current or the regeneration current flowing through the energy storage device.

4. The drive device for the railway vehicle according to claim 1,
wherein when the power running operation or the regeneration operation of the inverter device is stopped, the current control device is operated beforehand so as to form a current path for preventing the power running current or the regeneration current from flowing through the energy storage device, and then the power running operation or the regeneration operation of the inverter device is stopped.

5. The drive device for the railway vehicle according to claim 4,
wherein when the power running operation or the regeneration operation of the inverter device is stopped, the current control device is controlled so as to gradually reduce the ratio of the power running current or the regeneration current flowing through the energy storage device, and to thereby gradually reduce the output voltage of the voltage adjustment device, and the current control device is operated so as to finally form a current path for preventing the power running current or the regeneration current from flowing through the energy storage device.

* * * * *